United States Patent
Xu et al.

(10) Patent No.: US 11,501,435 B2
(45) Date of Patent: Nov. 15, 2022

(54) UNSUPERVISED CONTENT-PRESERVED DOMAIN ADAPTATION METHOD FOR MULTIPLE CT LUNG TEXTURE RECOGNITION

(71) Applicant: DALIAN UNIVERSITY OF TECHNOLOGY, Liaoning (CN)

(72) Inventors: Rui Xu, Liaoning (CN); Xinchen Ye, Liaoning (CN); Haojie Li, Liaoning (CN); Lin Lin, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 161 days.

(21) Appl. No.: 17/112,623

(22) Filed: Dec. 4, 2020

(65) Prior Publication Data
US 2021/0390686 A1 Dec. 16, 2021

(30) Foreign Application Priority Data
Jun. 15, 2020 (CN) .......................... 202010541959.1

(51) Int. Cl.
*G06T 7/40* (2017.01)
*G06T 7/00* (2017.01)

(52) U.S. Cl.
CPC .............. *G06T 7/0012* (2013.01); *G06T 7/40* (2013.01); *G06T 2207/10081* (2013.01);
(Continued)

(58) Field of Classification Search
CPC ................ G06T 7/0012; G06T 7/40; G06T 2207/10081; G06T 2207/20081;
(Continued)

(56) References Cited

U.S. PATENT DOCUMENTS

2018/0144466 A1* 5/2018 Hsieh .................... G06T 7/0012
2020/0160997 A1* 5/2020 Bagci .................... G16H 50/20
(Continued)

OTHER PUBLICATIONS

Yongjun Chang, Jonghyuck Lim and et al., "A support vector machine classifier reduces interscanner variation in the hrct classification of regional disease pattern in diffuse lung diseases: comparison to a Bayesian classifier,"Medical Physics, vol. 40, No. 5, pp. 051912, 2013; (pp. 13).
(Continued)

*Primary Examiner* — Siamak Harandi
(74) *Attorney, Agent, or Firm* — Muncy, Geissler, Olds & Lowe, P.C.

(57) ABSTRACT

The invention discloses an unsupervised content-preserved domain adaptation method for multiple CT lung texture recognition, which belongs to the field of image processing and computer vision. This method enables the deep network model of lung texture recognition trained in advance on one type of CT data (on the source domain), when applied to another CT image (on the target domain), under the premise of only obtaining target domain CT image and not requiring manually label the typical lung texture, the adversarial learning mechanism and the specially designed content consistency network module can be used to fine-tune the deep network model to maintain high performance in lung texture recognition on the target domain. This method not only saves development labor and time costs, but also is easy to implement and has high practicability.

2 Claims, 4 Drawing Sheets

(52) U.S. Cl.
CPC ............... *G06T 2207/20081* (2013.01); *G06T 2207/20084* (2013.01); *G06T 2207/30061* (2013.01)

(58) Field of Classification Search
CPC . G06T 2207/20084; G06T 2207/30061; G06T 7/41
See application file for complete search history.

(56) References Cited

U.S. PATENT DOCUMENTS

2021/0190892 A1* 6/2021 Yap .................... G01R 33/5608
2021/0192719 A1* 6/2021 Laaksonen ........... A61N 5/1031

OTHER PUBLICATIONS

Kaiming He, Xiangyu Zhang, and et. al., "Deep residual learning for image recognition," in Computer Vision and Pattern Recognition, 2016, pp. 770-778; (pp. 9).

Eric Tzeng, Judy Hoffman and et al., "Adversarial discriminative domain adaptation," in Proceedings of the IEEE Conference on Computer Vision and Pattern Recognition, 2017, pp. 7167-7176; (pp. 10).

Jun-Yan Zhu, Taesung Park and et al., "Unpaired image-to-image translation using cycle-consistent adversarial networks," in Proceedings of the IEEE International Conference on Computer Vision, 2017, pp. 2223-2232; (pp. 10).

* cited by examiner

UNSUPERVISED CONTENT-PRESERVED DOMAIN ADAPTATION METHOD FOR MULTIPLE CT LUNG TEXTURE RECOGNITION

TECHNICAL FIELD

The invention belongs to the field of medical image processing and computer vision, and in particular relates to an unsupervised content-preserved domain adaptation method for multiple CT lung texture recognition.

BACKGROUND

Diffuse lung disease refers to the general term for abnormal texture of the lung interstitial caused by factors such as inflammation or injury in the lung area. The Computer-Aided Diagnosis (CAD) system for diffuse lung diseases can assist radiologists in diagnosing diffuse lung diseases, the accurate recognition of the texture of diffuse lung diseases in CT images is a key step in the construction of the CAD system. At present, methods based on deep convolutional neural network have been invented and applied to the texture recognition of diffuse lung diseases, and good results have been obtained.

However, due to the difficulty of obtaining medical data, when developing algorithms based on deep networks, usually only one type of CT image data is collected, and the algorithm is designed and validated on this data. In the algorithm development stage, the deep network model developed can only obtain good recognition results on the same type of CT image data; In the actual application stage, when this model is directly applied to different types of CT image data, the recognition accuracy of the texture of lung will be greatly reduced. This is because different types of CT images have different noise, imaging, etc., which results in a network model designed for only one type of CT data, when directly applied to other types of CT data, remains a problem of insufficient generalization of the network model.

In response to this problem, although different types of CT image data can be collected and mixed together to train the network model, the generalization of the network model to different types of CT image data can be improved (Yongjun Chang, Jonghyuck Lim and et al., "A support vector machine classifier reduces interscanner variation in the hrct classification of regional disease pattern in diffuse lung diseases: comparison to a Bayesian classifier," Medical Physics, vol. 40, no. 5, pp. 051912, 2013.). However, this method not only requires collecting other different types of CT image data, but also requires tedious and laborious manual labeling of the typical lung texture areas in these new CT images. Therefore, a more convenient and effective technique is needed to solve the generalization problem of deep network models of different types of CT data.

SUMMARY OF THE INVENTION

The present invention aims to overcome the deficiencies of the prior art, and provides an unsupervised content-preserved domain adaptation method for multiple CT lung texture recognition. This method can make a deep network model trained in advance on one type of CT data (in the source domain), including CT images and manual annotation of typical lung texture areas, when applied to another CT image (in the target domain), on the premise that only CT images of the target domain are obtained without manually labeling the typical lung textures, the adversarial learning mechanism and a specially designed content consistency network module can be used to fine-tune the deep network model so that the recognition of texture of lungs in the target domain maintains high performance.

The specific technical solution of the present invention is an unsupervised content-preserved domain adaptation method for multiple CT lung texture recognition, including the following steps:

1) Training and test data preparation: Two sets of CT images of different types are collected, and the typical lung texture areas are marked on these two sets of CT images manually. After that, a group of images is randomly designated as source domain data, and another group of images is targeted domain data. The CT images on the source domain and the manually-labeled lung texture areas will be processed into labeled (texture category) CT patches for supervise training deep network models on the source domain. The data in the target domain will be processed into labeled and unlabeled CT small patches, of which the unlabeled CT small patches are used for unsupervised fine-tuning of the pre-trained deep network model, and the labeled CT small patches are used for testing the final result of the technical solution proposed by the present invention;

2) Construction and supervised training of the recognition network on the source domain: use residual network (Kaiming He, Xiangyu Zhang, and et. al., "Deep residual learning for image recognition," in Computer Vision and Pattern Recognition, 2016, pp. 770-778.) to construct a deep network model, whose structure includes two parts: encoder and classifier. The encoder extracts the input CT lung texture image feature representation, and the classifier uses the feature representation to generate a recognition result. Use the labeled CT small patches in the source domain and supervise training the deep network, so that the network model achieves good recognition performance in the source domain data;

3) Deep model fine-tuning on the target domain: For the deep network model of the source domain obtained in step (2), use the unlabeled CT small patches in the target domain, and use the loss function based on the adversarial learning mechanism for unsupervised domain adaptation. At the same time, the content consistency module and the content consistency loss function are used to constrain the content of the target domain encoder, and then combined with the supervised classification training in the source domain, the labeled CT patches in the source domain must be used again to jointly fine-tune the deep model in target domain, so that the deep network model can maintain good lung texture recognition performance in the target domain;

4) Performance test of the deep network model: Use the labeled CT small patches on the target domain, and calculate the common indicators to measure the recognition performance, such as correct recognition accuracy and F-value, to test the performance of the final deep network model.

Construction and supervised training of the recognition network on the source domain include the following steps:

2-1) Use the residual network to construct the recognition network, including the encoder and the classifier. The encoder is composed of several convolution modules to extract the input CT lung texture image feature representation. The classifier includes several convolution modules, a global average pooling layer, and a fully connected layer, which uses feature representation to generate recognition results;

2-2) Each convolution module is composed of a convolution layer, a batch normalization layer, and a rectified linear unit layer. These are the general structures of deep convolutional neural networks;

2-3) In addition to the first convolution module, the remaining convolution modules in the recognition network form residual modules through jump connections. The residual module is also a general network structure, which can be referred to existing literature (Kaiming He, Xiangyu Zhang, and et. al., "Deep residual learning for image recognition," in Computer Vision and Pattern Recognition, 2016, pp. 770-778.);

2-4) Use labeled CT small patches in the source domain to perform supervised network training on deep networks. Specifically, the classification cross-entropy loss function is calculated in a small batch, and the classification cross-entropy loss function is optimized through a stochastic gradient descent algorithm to obtain a deep network model in the source domain. The calculation formula of the classification cross-entropy loss function is as follows:

$$L_{task}(f,h) = -\mathbb{E}_{(x_s,y_s) \sim (X_s,Y_s)} \sum_{k=1}^{K} 1^{[k=y_s]} \log(h(f(x_s)))$$

In the formula, $L_{task}$ (•) represents the cross-entropy loss function value, f represents the encoder, h represents the classifier, $\mathbb{E}$ represents the mathematical expectation, $x_s$ represents the source CT image data matrix participating in the training in a single batch, and $y_s$ represents the category label matrix corresponding to $x_s$, $X_s$ represents the source domain CT image matrix set, $Y_s$ represents the corresponding category label matrix set of $X_s$, $\Sigma$ represents the summation operator, K represents the number of classification categories, K is 6 in the present invention, log (•) represents the logarithm operation.

Fine-tuning of the deep model on the target domain includes the following steps:

3-1) Construct a deep network with the same structure as the source domain network model for the target domain data, and make the encoders and classifiers of these two networks share the same network parameter weights, use the parameter weights of network model trained with source domain data as initial values, and fine-tune the network model on the target domain;

3-2) Use an adversarial learning mechanism to construct a discriminator, perform domain adaptation by optimizing an adversarial loss function, and reduce the domain deviation of the encoder features of source and target domains. The discriminator consists of convolution modules and a fully connected layers, the source domain and target domain encoder features are represented as inputs, the source domain encoder feature representation is determined as the source domain result (label is 1), and the target domain encoder feature representation is determined as the target domain result (label is 0). The formula for the adversarial loss function is as follows:

$$L_{adv}(D,f) = \mathbb{E}_{x_s \sim X_s} \log(D(f(x_s))) + \mathbb{E}_{x_t \sim X_t} \log(1-D(f(x_t)))$$

In the formula, $L_{adv}$ (•) represents the value of the adversarial loss function, D represents the discriminator, f represents the encoder, $\mathbb{E}$ represents the mathematical expectation, $x_s$ represents the source domain CT image data matrix participating in the training in a single batch, and $x_t$ represents the target domain CT image data matrix participating in the training in a single batch, $X_s$ represents the CT image matrix set of the source domain, $X_t$ represents the CT image matrix set of the target domain, and log (•) represents the logarithmic operation;

3-3) Use the content consistency module to constrain the feature representation of the target domain encoder and the input target CT lung texture image through the content consistency loss function to maintain the content consistency of the target domain. The content consistency module includes convolution modules and residual modules, which reconstructs the feature representation of the target domain encoder into a single-channel image, and is constrained by the L1 norm with the input target domain CT lung texture image. The content consistency loss function formula is as follows:

$$L_{cp}(f,g) = \mathbb{E}_{x_t \sim X_t} \|x_t - f(f(x_t))\|_1$$

In the formula, $L_{cp}$ (•) represents the content consistency loss function value, f represents the encoder, g represents the content consistency module, $\mathbb{E}$ represents the mathematical expectation, $x_t$ represents the target CT image data matrix participating in training in a single batch, and $X_t$ represents the CT image matrix set in the target domain, $\|\cdot\|_1$ represents the L1 norm;

3-4) Use the unlabeled CT small patches in the target domain, and use the labeled CT small patches in the source domain again to calculate the summation of adversarial loss function, content consistency loss function and classification cross-entropy loss function in the source domain as the overall loss function of network fine-tuning, the specific formula is as follows:

$$L_{total}(f,h,g,D) = L_{adv}(D,f) + \lambda_{cp} L_{cp}(f,g) + \lambda_{task} L_{task}(f,h)$$

In the formula, $L_{total}$ (•) represents the overall loss function value of the unsupervised content-preserved domain adaptation, f represents the encoder, h represents the classifier, g represents the content consistency module, D represents the discriminator, $L_{adv}$ represents the value of the adversarial loss function, $\lambda_{cp}$ represents the content consistency loss function coefficient, in the present invention, $\lambda_{cp}$ is 1.0, $L_{cp}$ is the content consistency loss function value, $\lambda_{task}$ represents the classification cross-entropy loss function coefficient, in the present invention, $\lambda_{task}$ is 100.0, $L_{task}$ represents the classification cross-entropy loss function value (for the definition, see the formula in step (2-4)).

3-5) Through the stochastic gradient descent algorithm, the overall optimization loss function in (3-4) is optimized to obtain a deep network model that is finally fine-tuned for the target domain.

The beneficial effects of the present invention are:

The invention is an unsupervised content-preserved domain adaptation method for multiple CT lung texture recognition. This method can make the deep network model trained in advance on one type of CT data (source domain), when applied to another type of CT image (target domain), under the premise of only obtaining a new type of CT image without manually labeling the typical lung textures, use the adversarial learning mechanism and the specially designed content consistency network module, fine-tune the deep network model to maintain high performance in lung texture recognition on the target domain. The system has the following characteristics:

1. Fine-tune the network of the target domain without tedious and time-consuming manual labeling on the target domain data, saving manpower and time costs, and improving the practicality of the method;

2. The method is simple and easy to implement;

3. Use the unsupervised domain adaptation method based on the adversarial learning mechanism to reduce the source and target domain encoder feature representation domain deviation;

4. Design the content consistency module to restrict the content of the target domain encoder through the content consistency loss function to ensure the consistency of the target domain content in the fine-tuning of the domain network.

DETAILED DESCRIPTION

Figure 1:
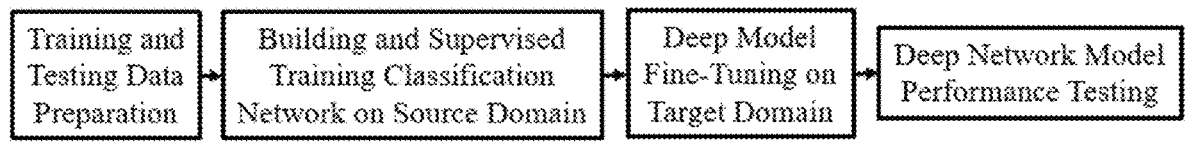
FIG. 1 is a specific implementation flowchart.

The present invention is described in detail with reference to the drawings and embodiments as follows:

The invention provides an unsupervised content-preserved domain adaptation method for multiple CT lung texture recognition. This method can make the deep network model trained in advance on one type of CT data (on the source domain), when applied to another type of CT image (on the target domain), under the premise of only obtaining the CT image of the target domain without manual annotation of typical lung texture, use the adversarial learning mechanism and the specially designed content consistency network module, fine-tune the deep network model to maintain high performance in lung texture recognition on the target domain. The specific implementation process is shown in FIG. 1. The method includes the following steps:

1) Training and test data preparation: Two sets of CT images of different types are collected, and the typical lung texture areas are marked on these two sets of CT images manually. After that, a group of images is randomly designated as source domain data, and another group of images is designated as targeted domain data. The CT images on the source domain and the manually-labeled lung texture areas will be processed into labeled (texture category) CT patches for supervised training deep network models on the source domain. The data in the target domain will be processed into labeled and unlabeled CT small patches, of which the unlabeled CT small patches are used for unsupervised fine-tuning of the pre-trained deep network model, and the labeled CT small patches are used for testing the final result of the technical solution proposed by the present invention. The specific steps are:

1-1) Collect two sets of CT images of different types. These two sets of CT images contain 6 commonly used typical lung textures, namely consolidation, ground glass opacity, honeycombing, emphysema, nodular and normal lung textures;

1-2) On these two sets of CT images, let an experienced radiologist select three coronal slices on each CT image, and manually outline the lung area containing the above-mentioned typical texture on these slices;

1-3) During algorithm design and testing, arbitrarily select one set of image data as data on the source domain, and another set of image data as data on the target domain;

1-4) Process the CT image on the source domain and the labeled typical lung texture area to generate several labeled (texture category) CT image patches with a size of 32×32. Specifically, on the marked CT coronal section slice, the upper left corner starts to move a 32×32 scan frame in a fixed step of 16 pixels in the horizontal and vertical directions, when the center point of the search frame is within the marked typical texture area, the CT image in the frame is intercepted and record the texture category. These labeled CT small patches in the source domain will be used to supervise training the deep network model in the source domain;

1-5) The CT image of the target domain is divided into two parts, which are used to generate several 32×32 CT small patches with and without labels, respectively. The method of generating labeled CT small patches is the same as in step (1-4). The unlabeled CT small patches generation method is to use the lung region automatic segmentation algorithm (Rui, Xu, Jiao Pan and et al., "A pilot study to utilize a deep convolutional network to segment lungs with complex opacities," in 2017 Chinese Automation Congress (CAC). IEEE, 2017, pp. 3291-3295.) to automatically segment the lung area in CT images to determine the lung area, and then a number of tomograms on the coronal axis are randomly selected, and a frame of 32×32 starts from the upper left corner scans in the horizontal and vertical directions at a fixed step of 16 pixels, when the center of the scan frame falls inside the lung, the 32×32 CT patch covered by the scan frame is cut out as unlabeled CT patch.

1-6) Unlabeled CT patches on the target domain will be used for fine-tuning of deep network models based on unsupervised training, and labeled CT patches will be used for performance testing of the final model.

2) Construction of the recognition network in the source domain and supervised training: the residual network is used to build a deep network model, and its structure includes two parts: an encoder and a classifier. The specific structure is shown in the virtual box in the upper part of FIG. 2. The encoder extracts the input CT lung texture image feature representation, and the classifier uses the feature representation to generate a recognition result. Use the labeled CT small patches in the source domain to train the deep network in a supervised manner, so that the network model achieves good recognition performance in the source domain data. The specific steps are:

2-1) Use the residual network to construct the recognition network, including the encoder and the classifier. The encoder includes 7 convolution modules to extract the input CT lung texture image feature representation. The classifier includes 12 convolution modules, a global average pooling layer and a fully connected layer, which uses feature representation to generate recognition results;

2-2) Each convolution module is composed of a convolutional layer, a batch normalization layer, and a rectified linear unit layer. These are commonly used structures of deep convolutional neural networks;

2-3) Except for the first convolution module, identify the remaining every two convolution modules in the network as a group, and form 9 residual modules by jump connection, in which the encoder has 3 residual modules, the classifier has 6 residual modules. The residual module is also a general network structure, which can be referred to existing literature (Kaiming He, Xiangyu Zhang, and et. al., "Deep residual learning for image recognition," in Computer Vision and Pattern Recognition, 2016, pp. 770-778.);

2-4) Use labeled CT small patches in the source domain to perform supervised network training on deep networks. Specifically, the classification cross-entropy loss function is calculated in a small batch, and the classification cross-entropy loss function is optimized through a stochastic gradient descent algorithm to obtain a deep network model in the source domain. The calculation formula of the classification cross-entropy loss function is as follows:

$$L_{task}(f, h) = -\mathbb{E}_{(x_s,y_s)\sim(X_s,Y_s)}\sum_{k=1}^{K} 1^{[k=y_s]}\log(h(f(x_s)))$$

In the formula, $L_{task}(\cdot)$ represents the cross-entropy loss function value, f represents the encoder, h represents the classifier, $\mathbb{E}$ represents the mathematical expectation, $x_s$ represents the source CT image data matrix participating in the training in a single batch, and $y_s$ represents the category label matrix corresponding to $x_s$, $X_s$ represents the source domain CT image matrix set, $Y_s$ represents the corresponding category label matrix set of $X_s$, $\Sigma$ represents the summation operator, K represents the number of classification categories, K is 6 in the present invention, log (•) represents the logarithm operation.

Figure 2:
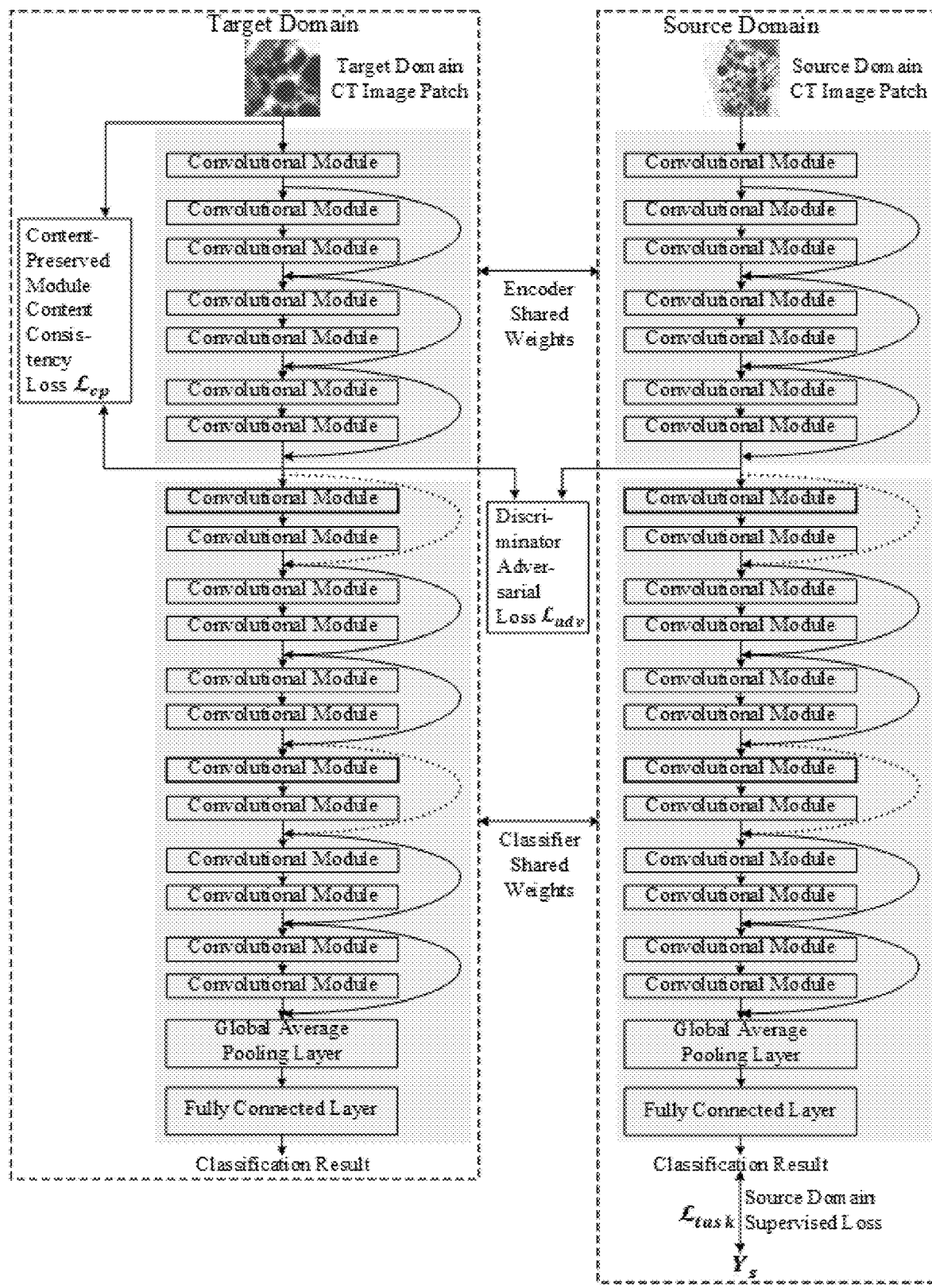
FIG. 2 is a diagram of the unsupervised content-preserved domain adaptation network structure.
Figure 3:
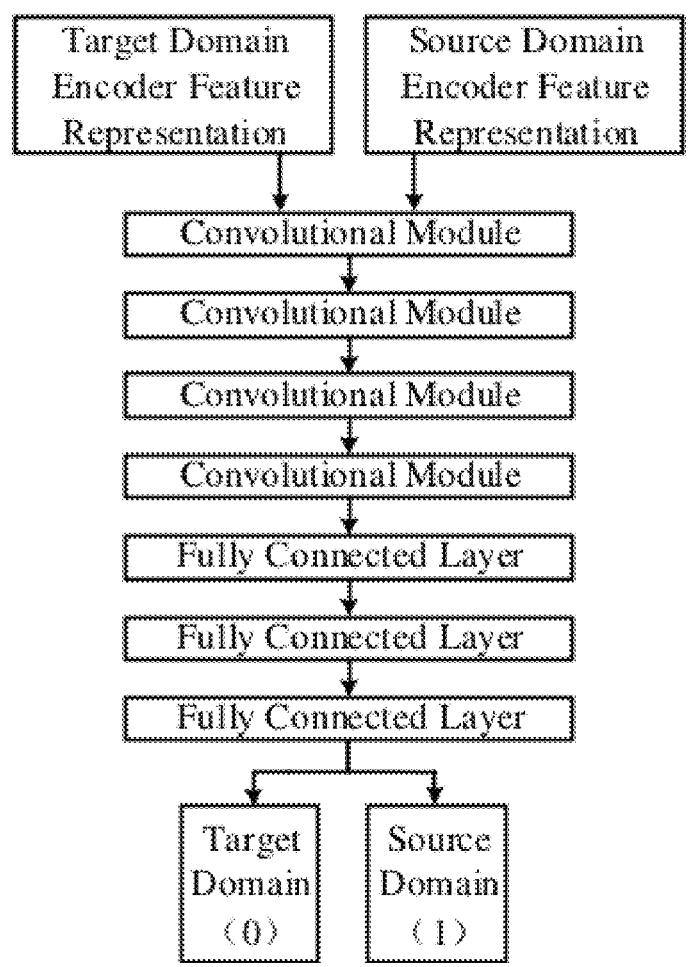
FIG. 3 is a structural diagram of a discriminator based on an adversarial learning mechanism.

3) Deep model fine-tuning on the target domain: For the deep network model of the source domain obtained in step (2), use the unlabeled CT small patches of the target domain, and use the loss function based on the adversarial learning mechanism to perform unsupervised domain adaptation. At the same time, the content consistency module and the content consistency loss function are used to constrain the content of the target domain encoder, and then combined with the supervised classification training in the source domain (need to use the labeled CT small patches in the source domain again) to jointly fine-tune the deep model of target domain, and finally the deep network model can maintain good lung texture recognition performance in the target domain. The specific steps are:

3-1) As shown by the dashed boxes in the lower half of FIG. 2, a deep network with the same structure as the source domain network model is constructed for the target domain data, and the encoders and classifiers of these two networks share the same network parameter weights, and use the parameter weights of the network model trained with the source domain data in (2-4) as the initial value to fine-tune the network model on the target domain;

3-2) Using the adversarial learning mechanism, construct the discriminator as shown in FIG. 3, perform domain adaptation by optimizing the adversarial loss function, and reduce the source and target domain encoder feature representation domain deviation. The discriminator consists of 4 convolutional modules and 3 fully connected layers, with the source domain and target domain encoder features as inputs, the source domain encoder feature representation is determined as the source domain result (label is 1), and the target domain encoder feature representation is determined as the target domain result (the label is 0). The formula for the adversarial loss function is as follows:

$$L_{adv}(D,f) = \mathbb{E}_{x_s\sim X_s}\log(D(f(x_s))) + \mathbb{E}_{x_t\sim X_t}\log(1-D(f(x_t)))$$

Figure 4:
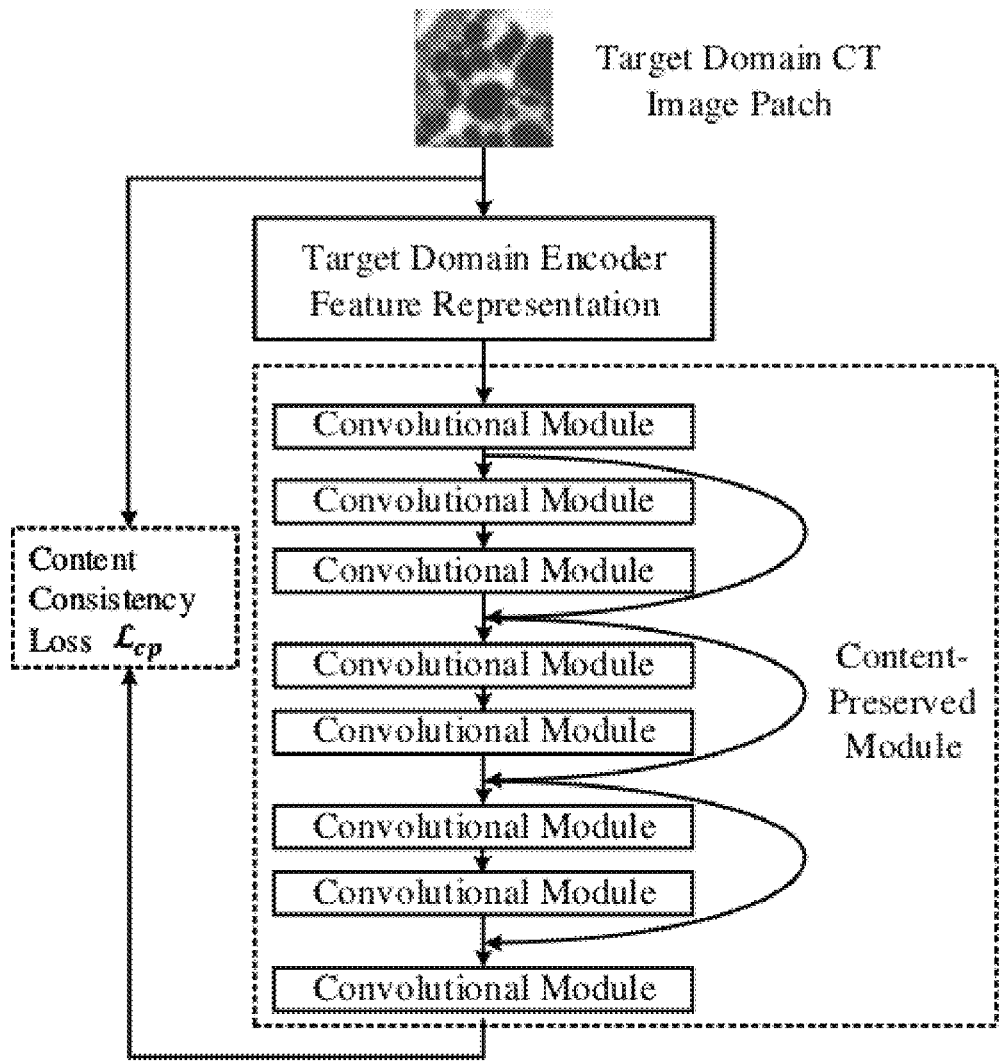
FIG. 4 is a structural diagram of the content consistency module.

In the formula, $L_{adv}(\sim)$ represents the value of the adversarial loss function, D represents the discriminator, f represents the encoder, $\mathbb{E}$ represents the mathematical expectation, $x_s$ represents the source domain CT image data matrix participating in the training in a single batch, and $x_t$ represents the target domain CT image data matrix participating in the training in a single batch, $X_s$ represents the CT image matrix set of the source domain, $X_t$ represents the CT image matrix set of the target domain, and log (•) represents the logarithmic operation;

3-3) Use the content consistency module to constrain the feature representation of the target domain encoder and the input target CT texture image through the content consistency loss function to maintain the content consistency of the target domain. The content consistency module is shown in FIG. 4, it includes 2 convolution modules and 3 residual modules. The feature representation of the target domain encoder is reconstructed into a single-channel image, which is constrained by the L1 norm with the input target domain CT lung texture images. The content consistency loss function formula is as follows:

$$L_{cp}(f,g) = \mathbb{E}_{x_t\sim X_t}\|x_t - g(f(x_t))\|_1$$

In the formula, $L_{cp}(\cdot)$ represents the content consistency loss function value, f represents the encoder, g represents the content consistency module, $\mathbb{E}$ represents the mathematical expectation, $x_t$ represents the target CT image data matrix participating in training in a single batch, and $X_t$ represents the CT image matrix set in the target domain, $\|\cdot\|_1$ represents the L1 norm;

3-4) Use the unlabeled CT small patches in the target domain, and use the labeled CT small patches in the source domain again to calculate the summation of adversarial loss function, content consistency loss function and classification cross-entropy loss function in the source domain as the overall loss function of network fine-tuning, the specific formula is as follows:

$$L_{total}(f,h,g,D) = L_{adv}(D,f) + \lambda_{cp}L_{cp}(f,g) + \lambda_{task}L_{task}(f,h)$$

In the formula, $L_{total}(\cdot)$ represents the overall loss function value of the unsupervised content-preserved domain adaptation, f represents the encoder, h represents the classifier, g represents the content consistency module, D represents the discriminator, $L_{adv}$ represents the value of the adversarial loss function, $\lambda_{cp}$ represents the content consistency loss function coefficient, in the present invention, $\lambda_{cp}$ is 1.0, $L_{cp}$ is the content consistency loss function value, $\lambda_{task}$ represents the classification cross-entropy loss function coefficient, in the present invention, $\lambda_{task}$ is 100.0, $L_{task}$ represents the classification cross-entropy loss function value (for the definition, see the formula in step (2-4)).

3-5) Through the stochastic gradient descent algorithm, the overall optimization loss function in (3-4) is optimized to obtain a deep network model that is finally fine-tuned for the target domain.

4) Performance test of the deep network model: Use the labeled CT small patches on the target domain to calculate the common indicators for measuring recognition performance, such as correct recognition accuracy and F-value, to test the performance of the final deep network model. The test results of the method of the present invention and the comparison results with two other recognized unsupervised domain adaptation methods are shown in Table 1, where (a) is the correct recognition accuracy and F-value of the method based on ADDA (Eric Tzeng, Judy Hoffman and et al., "Adversarial discriminative domain adaptation," in Proceedings of the IEEE Conference on Computer Vision and Pattern Recognition, 2017, pp. 7167-7176.); (b) is the correct recognition accuracy and F-value of the method based on Cycle-GAN (Jun-Yan Zhu, Taesung Park and et al., "Unpaired image-to-image translation using cycle-consistent adversarial networks," in Proceedings of the IEEE International Conference on Computer Vision, 2017, pp. 2223-2232.); (c) is the correct recognition accuracy and F-value of the present invention (CPDA-Net). Group 1→Group 2 means that the first group of CT data is used as the source domain and the second group of CT data is used as the target domain to train and fine-tune the deep network model. Group 2→Group 1 means that the second group of CT data is used as the source domain and the first group of CT data is used as the target domain to train and fine-tune the deep network model.

TABLE 1

Performance evaluation of the method of the present invention and comparison with other methods

| Methods | Group 1 → Group 2 | | Group 2 → Group 1 | |
| --- | --- | --- | --- | --- |
|  | Accuracy | $F_{avg}$ | Accuracy | $F_{avg}$ |
| (a) ADDA | 80.68% | 0.7824 | 60.54% | 0.5607 |
| (b) Cycle-GAN | 85.34% | 0.8560 | 83.82% | 0.8092 |
| (c) CPDA-Net | 93.74% | 0.9369 | 86.22% | 0.8538 |

These two methods are based on ADDA and CycleGAN respectively. Although they are not the methods proposed for lung texture recognition of different types of CT images, they are recognized as effective methods in the field of domain adaptation deep networks. The technical solution proposed by the present invention is more effective than these two methods.

The invention claimed is:

1. An unsupervised content-preserved domain adaptation method for multiple CT lung texture recognition, wherein comprising the following steps:
   1) training and test data preparation: collecting two sets of CT images of different types, and manually marking typical lung texture areas on the two sets of CT images; thereafter, randomly designating a set of images as source domain data, and another set of images as target domain; processing the CT images of the source domain inside the manually labeled lung texture areas to be labeled CT small patches, which are used to supervise training a deep network model on the source domain; processing data in the target domain to be labeled and unlabeled CT small patches, among which the unlabeled CT small patches are used for unsupervised fine-tuning of pre-trained deep network models, and the labeled CT small patches are used to test the lung texture recognition in the target domain;
   2) construction of a recognition network in the source domain and supervised training: applying a residual network to build a deep network model comprising an encoder and a classifier, wherein the encoder extracts the input CT lung texture image feature representation, and the classifier uses the feature representation to generate recognition results; training the deep network model in a supervised manner by using the labeled CT small patches in the source domain, so that the network model achieves good recognition performance in the source domain data;
   3) deep model fine-tuning in the target domain: for the source domain deep network model obtained in step 2), performing unsupervised domain adaptation by using an adversarial learning based loss function and the unlabeled CT small patches in the target domain; at the same time building a content consistency module and a content consistency loss function to constrain the content of the target domain encoder; meanwhile using the labeled CT patches of the source domain again to continue the supervised classification training; jointly performing all of them to fine-tune the deep model, so that the model maintains good lung texture recognition performance in the target domain.

2. The unsupervised content-preserved domain adaptation method for multiple CT lung texture recognition according to claim 1, wherein the deep model fine-tuning on the target domain in step 3) specifically includes the following steps:
   3-1) building a deep network with the same structure as the source domain network model for the target domain data, and making the encoders and classifiers of these two networks share the same network parameter weights; using the parameter weights of network model trained by the source domain data in step (2) as initial values, and fine-tuning the network model on the target domain;
   3-2) using an adversarial learning mechanism to construct a discriminator, and performing domain adaptation by optimizing the adversarial loss function to reduce the source and target domain encoder feature representation domain deviation; using a convolution module and a fully connected layer to build the discriminator, which takes the source domain and the target domain encoder feature representation as input, determining the source domain encoder feature representation as the source domain result, and determining the target domain encoder feature representation as the target domain result; the formula for the adversarial loss function is as follows:

$$L_{adv}(D,f) = \mathbb{E}_{x_s \sim X_s} \log(D(f(x_s))) + \mathbb{E}_{x_t \sim X_t} \log(1 - D(f(x_t)))$$

in the formula, $L_{adv}(\bullet)$ represents a value of the adversarial loss function, D represents a discriminator, f represents the encoder, $\mathbb{E}$ represents a mathematical expectation, $x_s$ represents a source domain CT image data matrix participating in the training in a single batch, and $x_t$ represents a CT image data matrix of the target domain participating in the training in a single batch, $X_s$ represents a CT image matrix set of the source domain, $X_t$ represents a CT image matrix set of the target domain, and $\log(\bullet)$ represents a logarithmic operation;
   3-3) building the content consistency module to constrain the feature representation of the target domain encoder and the input target lung CT texture image through the content consistency loss function to maintain the content consistency of the target domain; the content consistency module includes the convolution module and a residual module, reconstructing the characteristic representation of the target domain encoder into a single-channel image, which is constrained by a L1 norm with the input target domain CT lung texture image; the content consistency loss function formula is as follows:

$$L_{cp}(f,g) = \mathbb{E}_{x_t \sim X_t} \|x_t - g(f(x_t))\|_1$$

in the formula, $L_{cp}(\bullet)$ represents a content consistency loss function value, f represents the encoder, g represents the content consistency module, $\mathbb{E}$ represents the mathematical expectation, $x_t$ represents the target CT image data matrix participating in training in a single batch, and $X_t$ represents the CT image matrix set in the target domain, $\|\bullet\|_1$ represents the L1 norm;
   3-4) using the unlabeled CT small patches in the target domain, and using the labeled CT small patches in the source domain again to calculate the summation of adversarial loss function, content consistency loss function and classification cross-entropy loss function in the source domain as the overall loss function of network fine-tuning, the specific formula is as follows:

$$L_{total}(f,h,g,D)=L_{adv}(D,f)+\lambda_{cp}L_{cp}(f,g)+\lambda_{task}L_{task}(f,h) \quad (5)$$

in the formula, $L_{total}(\cdot)$ represents the overall loss function value of the unsupervised content-preserved domain adaptation, f represents the encoder, h represents the classifier, g represents the content consistency module, D represents the discriminator, $L_{adv}$ represents the value of the adversarial loss function, $\lambda_{cp}$ represents a content consistency loss function coefficient, $L_{cp}$ is the content consistency loss function value, $\lambda_{task}$ represents a classification cross-entropy loss function coefficient, $L_{task}$ represents a classification cross-entropy loss function value; the calculation formula of the classification cross-entropy loss function is as follows:

$$L_{task}(f,h) = -\mathbb{E}_{(x_s,y_s)\sim(X_s,Y_s)} \sum_{k=1}^{K} 1^{[k=y_s]} \log(h(f(x_s)))$$

in the formula, $L_{task}(\cdot)$ represents the cross-entropy loss function value, f represents the encoder, h represents the classifier, $\mathbb{E}$ represents the mathematical expectation, $x_s$ represents the source CT image data matrix participating in the training in a single batch, and $y_s$ represents a category label matrix corresponding to $x_s$, $X_s$ represents the source domain CT image matrix set, $Y_s$ represents a corresponding category label matrix set of $X_s$, $\Sigma$ represents the summation operator, K represents a number of classification categories, K is 6, $\log(\cdot)$ represents the logarithm operation.

* * * * *